United States Patent
Muramatsu et al.

(10) Patent No.: US 7,072,732 B2
(45) Date of Patent: Jul. 4, 2006

(54) MULTI-ITEM MULTI-PROCESS LOT SIZE SCHEDULING METHOD

(75) Inventors: Kenji Muramatsu, Tokyo (JP); Aditya Warman, Hadano (JP); Minoru Kobayashi, Satte (JP); Takuya Yamaguchi, Tokyo (JP)

(73) Assignees: Tokai University Educational System, Tokyo (JP); Information and Mathematical Science Laboratory, Tokyo (JP)

( * ) Notice: Subject to any disclaimer, the term of this patent is extended or adjusted under 35 U.S.C. 154(b) by 639 days.

(21) Appl. No.: 10/330,907

(22) Filed: Dec. 27, 2002

(65) Prior Publication Data
US 2003/0105543 A1    Jun. 5, 2003

Related U.S. Application Data

(63) Continuation of application No. PCT/JP02/04352, filed on May 1, 2002.

(30) Foreign Application Priority Data
May 1, 2001   (JP)   ............................. 2001-134739

(51) Int. Cl.
  *G06F 19/00*   (2006.01)
  *G06F 17/60*   (2006.01)
(52) U.S. Cl. ............................. 700/103; 700/100; 705/8
(58) Field of Classification Search .......... 700/99–103; 705/8
  See application file for complete search history.

(56) References Cited

U.S. PATENT DOCUMENTS 5,295,065 A * 3/1994 Chapman et al. ............. 700/99
5,971,584 A * 10/1999 Iriuchijima et al. .......... 700/101
6,031,984 A * 2/2000 Walser ............................ 703/2
6,829,514 B1 * 12/2004 Gyorfi et al. .................. 700/99

FOREIGN PATENT DOCUMENTS

| JP | 6-161512 | 6/1994 |
| JP | 8-215996 | 8/1996 |
| JP | 8-279013 | 8/1996 |
| JP | 9-44471  | 9/1997 |

OTHER PUBLICATIONS

Supplementary European Search Report dated Mar. 18, 2003, corresponding to EP Application No. 02724660.
Aghezzaf et al., "Hybrid Flowshops: an LP based heuristic for the planning level problems", Emerging Technologies and Factory Automation, 1995.
Jinxing Xie et al., "A parallel heuristic algorithm for multi-stage lot sizing in general production system", System, Man and Cybernetics, 1996.
Hennet, J.C., "A decompsed resolution technique for the cyclic ecenomic lot-sizing and scheduling problem", Emerging Technologies and Factory Automation, 1999.

(Continued)

*Primary Examiner*—Albert W. Paladini
*Assistant Examiner*—Ryan A. Jarrett
(74) *Attorney, Agent, or Firm*—Ohlandt, Greeley, Ruggiero & Perle LLP.

(57) ABSTRACT

A computer solves an item-based one-dimensional sub-optimization problem independently of the other items. For the item-based solution found, the computer determines whether machine interference between the items is eliminated and whether a work-in-process inventory is sufficient. If machine interference is not eliminated or the work-in-process inventory is not insufficient, then the computer updates a corresponding Lagrange multiplier and reexecutes the solving of the problem.

16 Claims, 6 Drawing Sheets

OTHER PUBLICATIONS

Czap, H., "An heuristic for lot sizing and scheduling", Methods of Operating Research, 1981, pps: 181-192.

Luh, P.B., Hoitomt, D.J., "Scheduling of manufacturing system using the lagrangian relaxation technique", Transactions on Automatic Control, vol. 38, No. 7, 1993, pps: 1066-1079.

International Search Report for PCT/JP02/04352, filed May 1, 2002.

Kenji Maramatsu, Kakucho Lagrange Bunaki Choseiho niyoru Saiteki Scheduling, *Communications of the Operations Research Society of Japan*, vol. 45, No. 6, 2000, pp. 270-275.

Richard Bellman, "Adaptive Control Processes: A Guide Tour," Princeton University Press (1961).

* cited by examiner

| $(\delta^k_{it-1}, s^k_{it-1})$ | $(\delta^k_{it}, s^k_{it})$ | | | | |
|---|---|---|---|---|---|
| | (0,0) | $(1, s^k_{it}=s^k_{it-1})$ | $(1, s^k_{it}=s^k_{it-1}-1)$ | $(1, s^k_{it}=s^k_{imax})$ | Others |
| (0,0) | ○ | × | × | ○ | × |
| (1,0) | ○ | ○ | × | × | × |
| $(1, 1 \leq s^k_{it-1} \leq s^k_{imax})$ | × | × | ○ | × | × |

MULTI-ITEM MULTI-PROCESS LOT SIZE SCHEDULING METHOD

CROSS-REFERENCE TO RELATED APPLICATIONS

This is a Continuation Application of PCT Application No. PCT/JP02/04352, filed May 1, 2002, which was not published under PCT Article 21(2) in English.

This application is based upon and claims the benefit of priority from the prior Japanese Patent Application No. 2001-134739, filed May 1, 2001, the entire contents of which are incorporated herein by reference.

BACKGROUND OF THE INVENTION

1. Field of the Invention

The present invention relates to a multi-item multi-process lot size scheduling method suitable for generating a production schedule applied to a multi-item multi-process production system which uses a plurality of machines to process items corresponding to a plurality of steps during these steps and in which at least one machine or step enables the items to be switched in connection with setup.

2. Description of the Related Art

In general, with a production system composed of multiple processes and multiple machines, production is commonly carried out by dividing a diversified order into a plurality of items and switching these items. With a production system of this kind, i.e. a multi-item multi-process production system, setup must be carried out for each process and each machine facility every time an item to be processed is switched. This setup requires setup time and a setup cost. However, the setup time may be 0. Both setup time and setup cost depend on the item to be processed. On the other hand, an inventory of items requires a holding cost in proportion to the period of holding. The holding cost depends on the item. Thus, it is necessary to make out an optimal schedule for the whole multi-item multi-process production system which prevents a shortage of items or a delay in delivery, and which minimizes the total cost over a planning horizon. This scheduling is called "multi-item multi-process lot size scheduling".

This scheduling deals with time optimization problems, in other words, problems to be solved for an optimal control process. As more and more items are produced, the size of their inventory increases. On the other hand, as more and more items are consumed, the size of their inventory decreases. Accordingly, the temporal transition of the inventory must be explicitly tracked for all items over the planning horizon.

Further, with the multi-item multi-process lot size scheduling, a single problem contains a mixture of various heterogeneous decision features. In particular, the mixture includes discrete decision features and continuous decision features. These various heterogeneous features are associated with one another and are thus difficult to separate. It is thus difficult to solve the above scheduling problem. The various decision features contained in the scheduling problem include lot sizing, lot sequencing, lot splitting, dispatching, and a decision for a work-in-process inventory for each item. They also include a decision for repeated processing executed by the same machine. These decision features all vary with time.

However, in the prior art, for example, the lot sizing falls under the category of continuous mathematics on the assumption that it is temporarily invariable. On the other hand, the lot sequencing falls under the category of discrete mathematics.

The problems with the multi-item multi-process lot size scheduling are also multi-dimensional. This is because a single item constitutes at least one dimension. Accordingly, the scheduling problem is a multi-dimensional time optimization problem. In this case, the time and memory capacity required for computations increase explosively unless the scheduling problem is decomposed. Thus, in the prior art, a solution to the scheduling problem is not expected to be found within the range of reasonable time and memory capacity. This is widely known as Bellman's curse of dimensionality as described in Document 1 "Bellman, R.: Adaptive Control Processes: A Guided Tour, Princeton University Press (1961)".

It is thus contemplated that the various heterogeneous decision features contained in the scheduling problem may be decomposed. However, this decomposition is difficult because these heterogeneous decision features are associated with one another and are thus difficult to separate. Thus, the prior art employs a method of sequentially taking up the heterogeneous decision features and processing each taken-up feature separately.

However, artificial constraints must be imposed on each feature in order to separate a feature of interest from the others, that is, to explicitly deal with the feature of interest. For example, lot sequencing requires the size of each lot to be determined beforehand. Thus, in the prior art, to solve a multi-dimensional time optimization problem containing various heterogeneous decision features, artificial constraints are unavoidably imposed whenever one feature is separated from the others. Consequently, it is difficult to simultaneously optimize all features.

BRIEF SUMMARY OF THE INVENTION

The present invention is provided in view of the above circumstances. It is thus an object of the present invention to enable the generation of an economical, reasonable, and feasible schedule that resolves various decision features contained in a multi-item multi-process scheduling problem, in terms of general optimization, without enumerating or being conscious of these features and without any need for artificial constraints.

According to an aspect of the present invention, there is provided a multi-item multi-product lot size scheduling method in which a computer generates a production schedule applied to a multi-item multi-process production system. At least one machine or process in this system enables items with setup to be switched in connection with setup. This method comprises a solving step, a coordinating step, a reexecuting step, and a generating step. The solving step comprises solving an item-based one-dimensional sub-optimization problem independently of the other items, which problem is under a first constraint on machine interference between the items and a second constraint that limits an inventory of work-in-process items to a non-negative value, the problem corresponding to a multi-item multi-process scheduling problems and being solved to make out a schedule for each item processed using the corresponding process. The coordinating step comprises carrying out coordination required to meet the first and second constraints on the basis of an item-based solution found in the solving step. The reexecuting step comprises causing the solving step to be reexecuted every time the coordinating step is executed. The generating step comprises generating a production schedule on the basis of the item-based solution found in the solving step when the first and second constraints are met.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
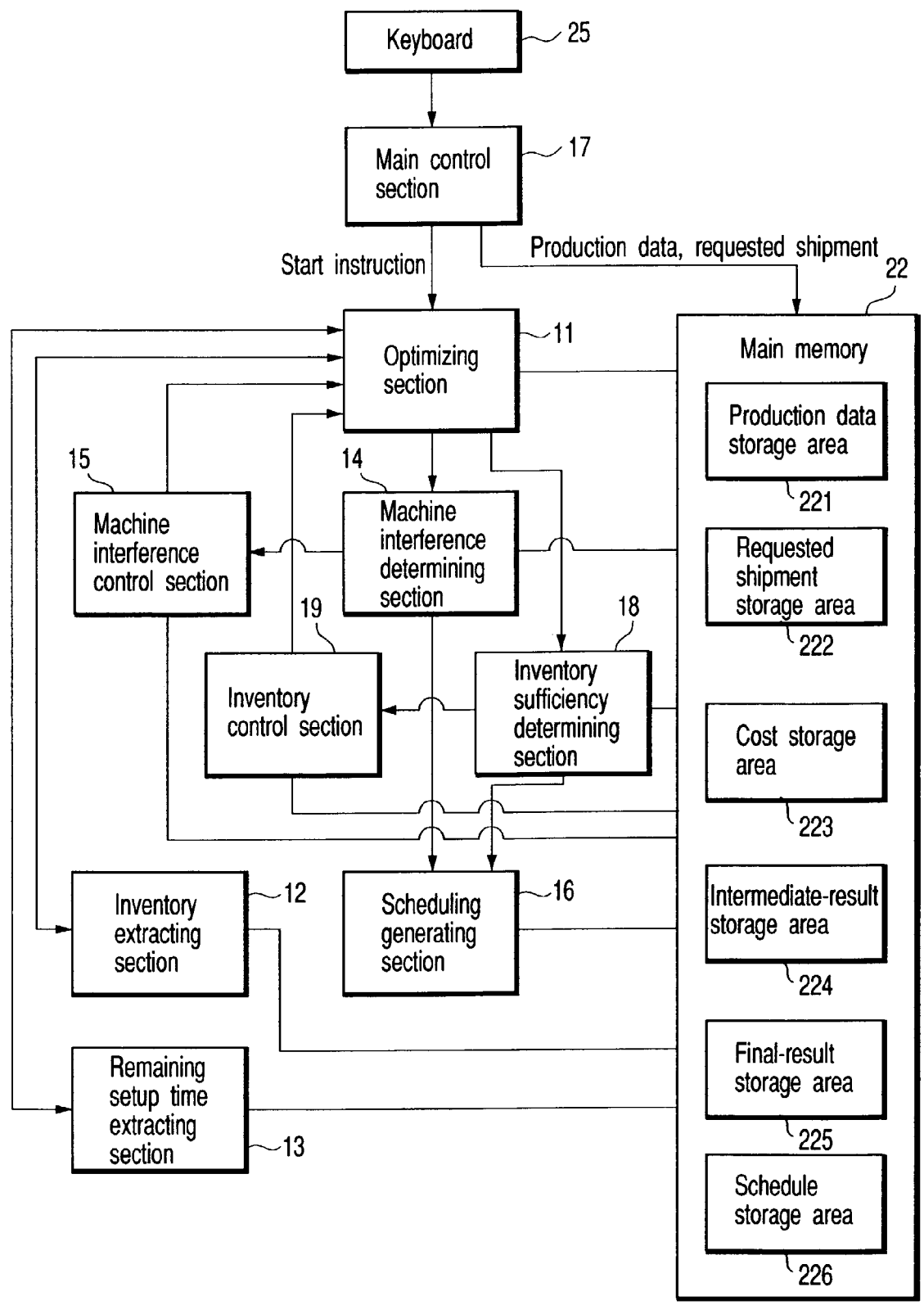
FIG. 1 is a block diagram showing the functional configuration of a multi-item multi-process lot size scheduling apparatus according to an embodiment of the present invention.

FIG. 1 is a block diagram showing the functional configuration of a multi-item multi-process lot size scheduling apparatus according to an embodiment of the present invention. The scheduling apparatus in FIG. 1 has a function of solving a problem in scheduling in a production system composed of multiple processes. This problem is a multi-dimensional time optimization problem in scheduling (multi-item multi-product lot size scheduling) required to carry out production by dividing a diversified order into a plurality of items and switching them. The scheduling apparatus in FIG. 1 also has a function of determining an optimal schedule (optimal production schedule) applied to the production system, on the basis of a solution to a multi-dimensional time optimization problem.

Figures 2, 5:
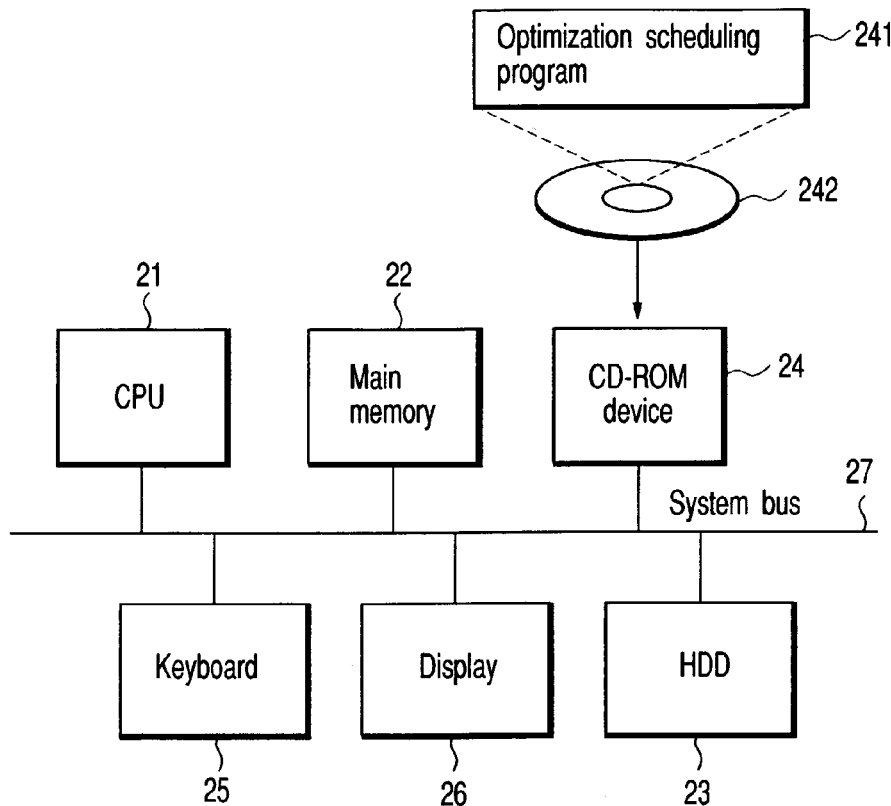
FIG. 2 is a block diagram showing a configuration of a computer implementing the scheduling apparatus in FIG. 1.
FIG. 5 is a table illustrating the relationship observed in a state transition from $(\delta_{it-1}^k, s_{it-1}^k)$ to $(\delta_{it}^k, s_{it}^k)$.

The scheduling apparatus in FIG. 1 is implemented by, for example, a computer such as a personal computer having a block configuration as shown in FIG. 2. The computer in FIG. 2 comprises a CPU 21, a main memory 22, a magnetic disk drive (hereinafter referred to as an "HDD") 23, a CD-ROM device 24, a keyboard 25, and a display 26. The CPU 21, the main memory 22, the HDD 23, the CD-ROM device 24, the keyboard 25, and the display 26 are interconnected by a system bus 27.

The CPU 21 is a main control unit of the computer. The main memory 22 stores various programs executed by the CPU 21, data, and the like. The HDD 23 is an external storage device of the computer. The CD-ROM device 24 has a function of loading information stored in a CD-ROM 242 into the computer. The CD-ROM 242 stores an optimization scheduling program 241 required for multi-item multi-process lot size scheduling applied to a production system that produces a plurality of items using a plurality of processes (multi-process) and multiple machines (multi-facility). It is assumed that the program 241 has been loaded into the computer from the CD-ROM 242 by the CD-ROM device 24 and then stored (installed) in the HDD 23. Alternatively, the program 241 can be downloaded into the HDD 23 via a communication line (not shown in the drawings). The keyboard 25 is an input device used to input production data and the like which is required to generate an optimal schedule. The display 26 is an output device for display. In the present embodiment, the functional configuration of the scheduling apparatus in FIG. 1 is implemented by the CPU 21 by loading the optimization scheduling program 241 installed in the HDD 23, onto the main memory 22 and then executing this program 241.

<<Basic Principle of the Optimization Scheduling>>

Now, description will be given of the basic principle of the optimization scheduling which is applied in the present embodiment and which is required to simultaneously optimize all decision features such as lot sizing, lot sequencing, a decision for a work-in-process inventory, and the like for each item.

<Formulation of a Time Optimization Problem into a High-Resolution Model>

In the present embodiment, a scheduling problem, i.e. a multi-dimensional optimization problem is formulated into a high-resolution model. Thus, in the present embodiment, a planning horizon is divided into short periods of time called "timeslots". Furthermore, the time optimization problem is decomposed into item-based pieces.

A timeslot is the minimum time unit used to solve a problem discretely. The width of the timeslot is determined so that a round-off error, notably in setup time or throughput (production) per timeslot, falls within a permissible range. For example, if the planning horizon is divided into 10-minute units, a round-off error in setup time is five minutes, so that a round-off error in throughput corresponds to an amount that can be processed within five minutes. If these round-off errors are permissible, the width of the timeslot (increment) is determined to be 10 minutes.

Thus dividing the time into small units is essential in simultaneously solving all decision features of a problem without being conscious of sequentially taking up all decision features of the problem. Next, the problem is dealt with for each item because actual processing is executed or an actual order is placed on the basis of items.

Here, to clarify the concept of detail in a model, the "resolution of the model" is defined as follows: To formulate a scheduling or business process into an equation model, it is first necessary to set a time axis and several axes that define a space. The business process is exploded onto this coordinate space. Thus, all minimum units into which these axes are divided are enumerated and are called the "resolution of the model". The resolution of the model in the present embodiment corresponds to timeslots, items, and machine facilities. Consequently, the resolution of a schedule obtained can be identified, even if time slots, items, and machine facilities vary.

<Decomposition of a Problem into Item-Based Pieces>

A multi-dimensional optimization problem in multi-item multi-process lot size scheduling can be separated into pieces. Further, this multi-dimensional optimization problem involves constraint equations. In this point, the multi-item multi-process lot size scheduling problem is similar to a multi-item single-machine lot size scheduling problem described in Document 2 "Kenji MURAMATSU: Simultaneous Optimization Scheduling Using Narrow Sense Lagrangian Decomposition Coordination Method, Operations Research vol. 45, no. 6, pp. 270 to 275. (2000)". Thus, in the present embodiment, the multi-item multi-process lot size scheduling problem is decomposed into item-based pieces. If this decomposition is possible, a solution to the problem will be found as the solution and coordination mentioned below even though the target production system has a very complicated structure particularly because of its multiple processes. That is, the solution to the problem will be found as a solution to an item-based sub-optimization problem and coordination required to meet interaction constraints.

However, this still does not enable a sub-optimization problem in multi-item multi-process lot size scheduling to be solved independently of the other problems. The reason is as follows: A multi-process scheduling problem is related to work-in-process items. The size of the inventory of actual work-in-process items increases if these items are processed before a process and decreases if they are processed after the process. Thus, a single item is related to two lines of processing. In other words, at least two types of items are present before or after processing, the numbers of these items increasing or decreasing owing to processing in one of the lines. Accordingly, if an attempt is made to optimize one of these sub-problems, then the optimization of the other sub-problem is affected. This relationship between a single item and two lines of processing is the primary obstacle to decomposition and coordination in the Lagrangian decomposition coordination method.

<Apparent Inventory>

First, the "independence of processing" is introduced in order to clarify a problem attributed to the relationship between a single item and two lines of processing. The "independence of processing" is defined as follows: The "independence of processing" is established when a scheduling problem is decomposed into sub-optimization problems and if the same processing or the same line of processing does not appear over a plurality of sub-optimization problems.

To ensure the independence of processing, one of the two lines of processing must be deleted from this single item without changing the essence of the problem. Means used for this purpose is the concept of an "apparent inventory", defined below. In general, the work-in-process inventory is an actual inventory occurring between processes. Accordingly, the work-in-process inventory can be defined as the sum of an initial inventory and an accumulated production minus an actual accumulated shipment or accumulated throughput for the next process. However, in the present embodiment, for a certain item, instead of the accumulated shipment actually delivered to the next process, an amount corresponding to the work-in-process inventory is computed using an accumulated amount. This accumulated amount is computed by exploding an outer (outside the production system) shipment request (outer demand) in each timeslot into the item as shown in Equation (1), described later. The amount corresponding to the work-in-process inventory is not an actual work-in-process inventory but is an imaginary or apparent inventory. This will hereinafter be called an "apparent inventory".

By thus newly introducing the concept of the apparent inventory instead of the work-in-process inventory, one item can be associated with one line of processing. However, planning processing on the basis of the apparent inventory may result in a shortage of the actual work-in-process inventory. Thus, it is necessary to have means for avoiding this risk. To achieve this, the present embodiment introduces the concept of the "consistency of processing", defined below.

The size of the actual inventory of a work-in-process item is increased or reduced by processing this work-in-process item and an item succeeding this work-in-process item. When this processing based on the independence of processing and the apparent inventory is feasible in that there will not be a shortage of the work-in-process inventory, it is said that the "consistency of processing" is established. Conversely, the independence of processing is observed as long as the "consistency of processing" is retained, but is not observed when the "consistency of processing" is lost. Accordingly, coordination is required in order to prevent a shortage of the actual work-in-process inventory (i.e. in order to maintain a sufficient actual work-in-process inventory). In this regard, the succeeding item is an item y which is produced during a process immediately after production of a certain item x and which is produced by incorporating the item x in itself. The item y is an item i, an item i−1, and others corresponding to an item 1, in the example shown in FIG. 8, described later. On the other hand, the item x is produced during a process immediately before the item y, i.e. the item x precedes the item y.

<To Achieve the Consistency of Processing>

In the present embodiment, to accomplish the consistency of processing, defined as described above, a condition for preventing the actual work-in-process inventory from running short, i.e. a non-negative condition for the actual work-in-process inventory is added to the interaction constraints as follows: First, the apparent inventory is used to formulate the amount corresponding to the actual work-in-process inventory as shown in Equation (7), described later. Subsequently, for the work-in-process inventory formulated using the apparent inventory, its non-negative condition is added to the constraints between the sub-problems, i.e. the interaction constraints and is explicitly processed.

<Echelon Inventory Holding Cost>

However, since sub-problems are solved by focusing on the apparent inventory rather on the actual work-in-process inventory, calculations become inconsistent if an ordinary inventory holding cost is applied. It is thus necessary to understand the inventory holding cost in connection with the apparent inventory. Then, the inventory holding cost can be computed so as to reflect the actual situation. A known method can be used in this case. That is, the concept of an "echelon inventory holding cost" is available.

The echelon inventory holding cost will be described below. First, for every item, when processing is executed to newly add a value to the item, the inventory holding cost can be estimated for the newly added value. Here, it should be noted that the inventory holding cost is not estimated for the whole value for the item resulting from the processing. Furthermore, this value is considered to be invariable even if the item is incorporated in another item as long as the former item is retained in the system. In this case, the inventory holding cost is estimated only for the newly added portion of the value for the newly produced item. The thus defined inventory holding cost is called an "echelon inventory holding cost".

The details of the echelon inventory holding cost will be described with reference to FIGS. 7A and 7B taking, by way of example, the case in which item 3 incorporating item 1 and item 2 is produced and shipped. First, it is assumed that item 1 is produced at time $\tau1$ and that item 2 is produced at time $\tau2$. It is assumed that item 3 is produced at time $\tau3$ and that item 4 is shipped at time $\tau4$. Inventory holding costs estimated for the values for items 1 and 2 are defined as h1 and h2, respectively. An inventory holding cost estimated for the newly added value obtained by producing item 3 is defined as h3.

Figure 7A:
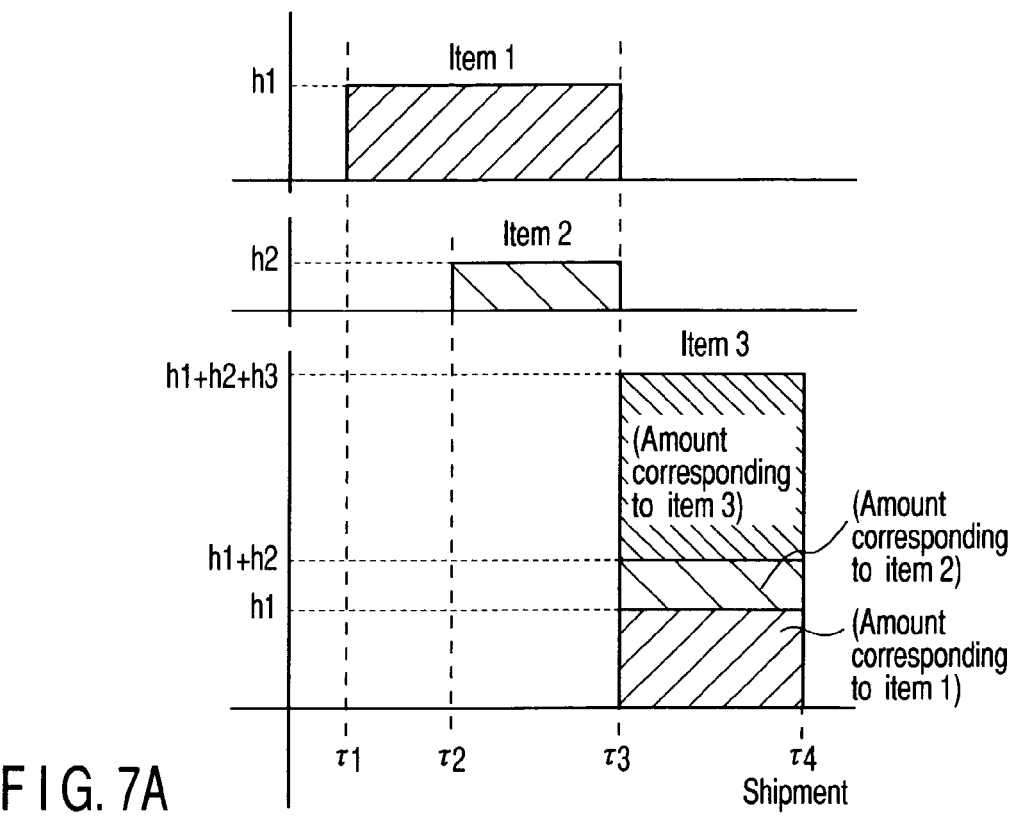
FIG. 7A is a chart illustrating a typical inventory holding cost.

In this case, in general, as shown in FIG. 7A, the inventory holding cost h1 of the item 1 occurs between the time $\tau1$ and the time $\tau3$. The inventory holding cost h2 of the item 2 occurs between the time $\tau2$ and the time $\tau3$. Further, the inventory holding cost of the item 3 is h1+h2+h3, i.e. the inventory holding cost h3 plus the sum h1+h2 of the inventory holding costs h1 and h2 of the items 1 and 2. The inventory holding cost h1+h2+h3 of the item 3 occurs between the time $\tau3$ and the time $\tau4$.

Figure 7B:
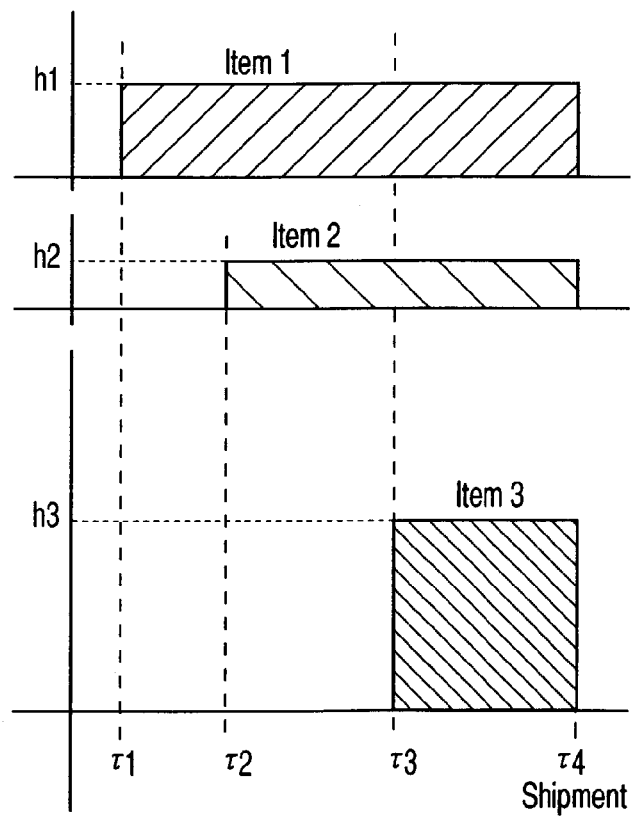
FIG. 7B is a chart illustrating an echelon inventory holding cost.

On the other hand, with the echelon inventory holding cost, as shown in FIG. 7B, the inventory holding costs h1 and h2 of the items 1 and 2, respectively, are treated as invariant even after the time $\tau3$, when the items 1 and 2 are incorporated in the item 3. The inventory holding costs h1 and h2 of the items 1 and 2, respectively, continue until the shipment time $\tau4$ for item 3. Further, the inventory holding cost of item 3 is only h3, estimated for the newly added value, and is considered to occur between the time $\tau3$ and the time $\tau4$. This allows the inventory holding costs of the items 1, 2, and 3 to be treated independently. This in turn allows the inventory holding costs to be based on the apparent inventory.

<Solution Using Repeated Computations Based on the Lagrangian Decomposition Coordination Method>

In the present embodiment, a Lagrangian function is derived by applying Lagrangian relaxation to all interaction constraint equations. This Lagrangian function can be decomposed. Thus, problem optimization is accomplished by alternately repeating the two processes described below.

One of the two processes is to solve an item-based sub-optimization problem for a given Lagrange multiplier value independently of the other items. The other is to update a Lagrange multiplier value corresponding to each constraint. A dynamic programming is used to solve sub-problems. In a sub-problem, some constraint equations are explicitly dealt with, while other constraint equations are dealt with as interaction constraints.

<Characteristics of a Solution Applied in the Present Embodiment>

It is contemplated that a scheduling problem may be solved by formulating it into a model with a high resolution and then using the Lagrangian decomposition coordination method, as described above. Here, it is contemplated that, for example, for a multi-item single-machine lot size scheduling problem, the Lagrangian decomposition coordination method may be used to optimize a production inventory problem for each item independently of the other items and to coordinate a fee (i.e. a Lagrange multiplier value) for a timeslot in which machine interference is occurring, to avoid the interference.

However, in the present embodiment, in addition to the above items (items to be shipped), items occurring between processes, i.e. work-in-process items must be decomposed. Accordingly, a mechanism is required which enable the decomposition of not only the items but also the processes. Thus, in the present embodiment, the independence of processing is derived by introducing the concepts of the work-in-process inventory, notably the apparent inventory corresponding to the work-in-process inventory, as well as the echelon inventory holding cost. Further, in the present embodiment, to ensure consistency in processing, the apparent inventory is used to formulate the actual work-in-process inventory, and a non-negative condition for the work-in-process inventory is added to the interaction constraint. In this manner, the present embodiment uses the new method of decomposing an item-based multi-item multi-process problem by introducing the concepts of the apparent inventory and the echelon inventory holding cost and using the above formulation. In this case, it should be noted that general optimization is accomplished by coordinating not only timeslots in which machine interference is occurring, but also Lagrange multipliers (that is, dual variables). The Lagrange multiplier corresponds to a fee (penalty cost) for a timeslot in which the work-in-process inventory is insufficient.

<<Formulation>>

Now, description will be given of the details of the formulation in the basic principle of the optimization scheduling.

<Preconditions>

First, preconditions for an optimization scheduling problem taken up in the present embodiment will be clarified.

(1) Object and Scope of Application

Every item in every process and every machine facility is formed into lots when processed. The size of the lots is determined when this problem has been solved. Optimization scheduling can be applied to both items that cannot be processed before an order is decided, and standard items that are permitted to have an initial inventory. In the former case, all initial inventories are treated as 0. Specifically, the optimization scheduling is likely to be applied to the whole or a part of a production process for printed circuit boards, semiconductors, kitchen furniture, audio/visual equipment (AV equipment), optical equipment, or the like.

Figure 8:
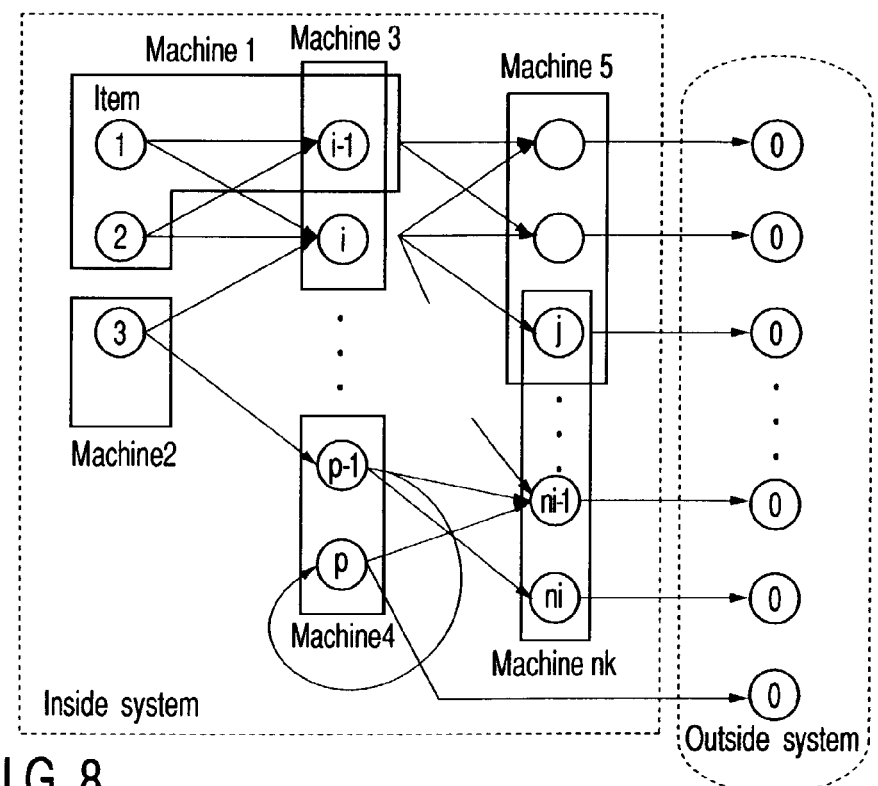
FIG. 8 is a diagram schematically showing a configuration of a multi-item multi-process production system to which a schedule generated by the scheduling apparatus in FIG. 1 is applied.

FIG. 8 shows an example of a configuration of a multi-item multi-process production system that carries out production by decomposing a diversified order into a plurality of items and switching them according to a schedule generated by the scheduling apparatus in FIG. 1. In the system in FIG. 8, for example, the same machine 4 repeats processing on items p−1 and p. In the present embodiment, the optimization scheduling can be applied to systems in which processing is repeated on the same machine facility as shown by the relationship between the machine 4 and the items p−1 and p, similarly to systems that do not execute such processing. An example is the case in which the same machine facility is used to execute both a print wiring process for the front surfaces of printed circuit boards and a print wiring process for their back surfaces. In this case, although all print circuit boards are the same, the printed circuit boards the front surfaces of which undergo the print wiring process are distinguished from the printed circuit boards the back surfaces of which undergo the print wiring process. That is, the printed circuit boards the front surfaces of which undergo the print wiring process are treated as items different from the printed circuit boards the back surfaces of which undergo the print wiring process (the former has a processing number different from that of the latter), and vice versa. This corresponds to the items p−1 and p on the machine 4 in FIG. 8.

(2) Requirements for Data

2a) Shipment request data for respective items are given during different timeslots over the planning horizon.

2b) It is assumed that during each timeslot, a net accumulated requested shipment, represented by processing time, does not exceed the process capacity. Actually, setup time for switching relates to this requirement. However, in the present embodiment, it is assumed that conditions for the presence of a feasible solution have been met.

(3) Inter-process Transfer Time

If inter-process transfer time or lead time (a period of time before processing) for processing (associated with inter-process transfer) is not negligible, this is taken into account in a model used to explode requirements.

(4) Discretization and Round-off Errors

In the present embodiment, a scheduling problem is formulated into a discretization problem beforehand. Increments in timeslots are determined on the basis of permissible round-off errors. For example, for a problem in which the setup time is between two and three hours and in which the planning horizon spans two weeks (24 hours×14 days), if the increment is determined to be 30 minutes, the round-off error is 15 minutes. In this case, the problem corresponds to a process of optimally controlling 2×24×14=672 timeslots.

(5) Action to Improve the Resolution of a Model

In typical scheduling, operations are treated as given units or existing objects. However, in the present embodiment, nothing corresponds to this. In the present embodiment, the minimum unit for a decision is a 1-0 decision variable indicating "whether or not an item is to be processed" during each timeslot. This decision variable itself is like a pixel in digital image processing, i.e. numbers of 1 or 0. However, they collectively represent decision features. For example, if consecutive timeslots for a certain item and a certain machine facility have a value of 1, this indicates a lot size.

<Symbols>

(1) Indices and Their Sets

First, indices and their sets applied in the present embodiment are defined as follows:

i: item number or its processing number, i∈I(1, 2, . . . , $n_i$); i=0 denotes a market (outside the system).

k: machine number, k∈K(1, 2, . . . , $n_k$)

t: timeslot number, t∈T(1, 2, . . . , $n_t$)

A: set of work-in-process items

S(i): set of items succeeding an item i

K(i): set of machines which can process the item i

M(i): set of items which can be processed by a machine k

P(i): set of items preceding the item i (2) Input Data

Next, preset input data (production data and requested shipment data) applied in the present embodiment is defined as follows:

$p_i^k$: throughput of the item i on the machine k per timeslot $s_{imax}^k$: setup time for the item i on the machine k $s_{i0}^k$: remaining setup time for the item i on the machine k in a timeslot t=0, i.e. an initial value $x_{i0}$: actual inventory of the item i in the timeslot t=0; this value is assumed to be 0 for problems without any inventories.

$\delta_{i0}^k$: initial state of the item i on the machine k in the timeslot t=0, i.e. an initial value $r_{i0t}$: requested shipment data indicating an outer demand for the item i in a timeslot t, i.e. items dispatched to the outside of the system as, for example, service parts $\rho_{ij}$: requirements of the item i per unit of an item j, the item i being incorporated in the item j $c_i^k$: setup cost of the item i on the machine k $h_i$: inventory holding cost (echelon inventory holding cost) per timeslot for a value newly added by processing the item i $r_{ijt}$: requirements of item i used to process the item j during the timeslot t $r_{i\cdot t}$: requirements of the item i in the timeslot t $\tau_{ij}$: lead time for the item i before it is incorporated in the item j (3) Decision and State Variables Now, decision and state variables are defined as follows:

$\delta_{it}^k$: decision variable which denotes the processing of the item i on the machine k in the timeslot t If the item i is processed on the machine k during the timeslot t, $\delta_{it}^k$ is 1. Otherwise, it is 0.

In this case, $\delta_{it}$ is a vector having elements $\delta_{it}^l$ and $1\epsilon K_i$, $\delta_i = (\delta_{i1}, \ldots, \delta_{it}, \ldots \delta_{int})$, and $\delta = (\delta_1, \ldots, \delta_i, \ldots \delta_{ni})$.

$s_{it}^k$: remaining setup time for the item i on the machine k in the timeslot t, where $0 \leq s_{it}^k \leq s_{imax}^k$ $s_{it}$ is a vector having elements $s_{ti}^l$ and $1\epsilon K(i)$, $s_i = (s_{i1}, \ldots, s_{it}, \ldots s_{int})$, and $s = (s_1, \ldots, s_i, \ldots s_{ni})$.

$x_{it}$: apparent inventory of the item i at the end of the timeslot t

A definition equation for $x_{it}$ is shown below.

$$x_{it} = x_{i0} + \sum_{t'=1}^{t} \sum_{k \in K(i)} p_i^k \delta_{it'}^k \bar{I}(s_{it'}^k) - \sum_{t'=1}^{t} r_{i \cdot t'} \quad (1)$$

wherein $$\bar{I}(s_{it}^k) \begin{cases} = 1, & \text{when } s_{it}^k = 0 \\ = 0, & \text{other cases} \end{cases}$$

However, if the item i is final product, the apparent inventory equals the actual inventory.

In this case, the following equations hold:

$x_i = (x_{i1}, \ldots, x_{it}, \ldots x_{int})$ $x = (x_1, \ldots, x_i, \ldots, x_{ni})$ In Equation (1), described above, $x_{it}$ is defined as the sum of an initial inventory $x_{i0}$ shown as the first term of the right side and an accumulated amount shown by the second term of the right side minus an accumulated amount shown by the third term of the right side. The second term of the right side denotes the total sum of throughput of the item i in a timeslot t' from t'=1 to t'=t, i.e. the throughput of the item i accumulated until the end of the timeslot t (accumulated production). The third term of the right side denotes the total sum of requirements of the item i in the timeslot t' from t'=1 to t'=t, i.e. a value obtained by exploding an outer shipment request in each timeslot before the end of the timeslot t, into the item i and accumulating the resultant amount. In this regard, for a work-in-process i∈A, $x_{i0}$ is a value for the apparent inventory $x_{it}$ in a timeslot t=0, i.e. an initial value. However, It should be noted that in Equation (1), $x_{i0}$ denotes an actual initial inventory.

(Constraints)

(1) Relationship Between Various Requirements

The requirements of the item j are exploded into the item i taking into account a lead time $\tau_{ij}$ for the item i before incorporation of the item i in the item j. In this case, the item i is work-in-process. Accordingly, $r_{ijt}$ is expressed by Equation (2), described below, using $\rho_{ij}$ as well as $r_{j \cdot (t-\tau ij)}$ that reflects the lead time $\tau_{ij}$. Further, $r_{j \cdot t}$ is expressed by Equation (3) using $r_{ijt}$ and $r_{i0t}$.

$$\rho_{ij} \begin{cases} \geq 1, & \text{when } i \in A, j \in S(i) \\ = 0 & \text{other cases} \end{cases}$$

$$r_{ijt} = \rho_{ij} r_{j \cdot (t-\tau_{ij})} \quad (2)$$

$$r_{i \cdot t} = \sum_{j \in S(i)} r_{ijt} + r_{i0t} \quad (3)$$

In Equation (3), $r_{j \cdot t}$ is expressed by the sum of an accumulated amount shown by the first term of the right side and the amount of the item dispatched to the outside of the system during the timeslot t and shown by the second term of the right side. The first term of the right side denotes the total sum of requirements of the item i used to produce the item j during the timeslot t, for all items j contained in S(i), i.e. the amount of the item i incorporated in the item j, corresponding to a post-process (the item j succeeds the item i).

(2) State Transition

Transition equation for the remaining setup time for the machine:

$s_{it}^k$ denotes the remaining setup time for each item i in the timeslot t as described above. $s_{it}^k$ is 0 while the machine (production line) is idle, and becomes $s_{imax}^k$ when the item is switched, i.e. a processing state changes from $\delta_{it-1}^k=0$ to $\delta_{it}^k=1$. Subsequently, the value for $s_{it}^k$ decreases by 1 every time one timeslot elapses, until it becomes 0. Then, $s_{it}^k$ maintains this state until the item is switched again. Consequently, $s_{it}^k$ conforms to the following equation:

$$s_{it}^k = s_{imax}^k (1-\delta_{it-1}^k)\delta_{it}^k + (s_{it-1}^k-1)_+ \delta_{it-1}^k \delta_{it}^k, \forall (i, t, k) \quad (4)$$

wherein $(y)_+ = \max(0, y)$.

The first term of the right side of Equation (4) indicates the state transition of the remaining setup time in which it becomes $s_{imax}^k$ when $\delta_{it-1}^k=0$ changes to $\delta_{it}^k=1$. $(s_{it-1}^k-1)$ in the second term of the right side indicates the state in which $s_{it}^k$ decreases by 1 whenever one timeslot elapses.

Inventory transition equation:

The actual processing of each item i in the timeslot t is limited to the state in which $\delta_{it}^k=1$ and $s_{it}^k=0$. Accordingly, the transition of the inventory conforms to the following equation:

$$x_{it} = x_{it-1} + \sum_{k \in K(i)} p_i^k \delta_{it}^k \bar{I}(s_{it}^k) - r_{i \cdot t} \quad (5)$$

$x_{it}$ in Equation (5) is expressed by the sum of the apparent inventory (first item of the right side) of the item i at the end of a timeslot t−1 and the throughput (second term of the right side) of the item i in the timeslot t minus requirements $r_{i \cdot t}$ of the item i.

Again, the third term of the right side does not denote the requested amount of the subsequent item but the requirements $r_{i \cdot t}$ obtained by exploding an outer demand. Consequently, for the work-in-process i∈A, $x_{it}$ denotes the apparent inventory at the end of the timeslot t. However, $x_{it}$ denotes the actual inventory at t=0. Further, $x_{it}$ also denotes the actual inventory for the final item.

Machine Interference Constraint

During every timeslot, the machine k can process at most one item. While setting up or processing one item, the machine k cannot set up another item. This is called a "machine interference constraint", which requires the following equation to be established:

$$\sum_{i \in M(k)} \delta_{it}^k \leq 1 \quad (6)$$

Conditions for Avoiding a Shortage of Items (Shortage Inhibition Constraint)

Every item i in every timeslot t is not permitted to run short. This is called a "non-negative condition for the inventory". For the final item, the apparent inventory also represents the actual inventory. Thus, the non-negative condition for the inventory is explicitly treated in a sub-optimization problem. However, for a work-in-process item, an actual work-in-process item must be formulated, and a non-negative condition must be set for this formula.

The work-in-process inventory of the item i during the timeslot t corresponds to an amount equal to the sum of the initial inventory $x_{i0}$ and the accumulated production, minus the accumulated amount of dispatched items. However, The amount $r_{i0t}$ of items directly shipped to the outside must be subtracted from the inventory beforehand. Accordingly, the following equation expresses the non-negative condition for the work-in-process inventory of the item i during the timeslot t:

$$x_{i0} + \sum_{t'=1}^{t} \left( \sum_{k \in K(i)} p_i^k \delta_{it'}^k \bar{I}(s_{it'}^k) - r_{i0t'} \right) - \quad (7)$$

$$\sum_{t'=1}^{t} \sum_{j \in S(i)} \rho_{ij} \sum_{k \in K(j)} p_j^k \delta_{jt'}^k \bar{I}(s_{jt'}^k) \geq 0$$

The second term of the left side of Equation (7) denotes the throughput of the item i accumulated before the end of the timeslot t, which equals the throughput of the item i in each timeslot from which the amount of items i directly shipped to the outside is subtracted, i.e. the second term denotes the accumulated production. The third term of the left side denotes the amount of dispatched items accumulated before the end of the timeslot t.

If the item is final product, the left side of Equation (7) is composed of only the first and second terms. When the definition equation (1) for the apparent inventory is substi tuted into the constraint equation (7) and the resultant equation is then rearranged, the following equation is given:

$$\sum_{j \in S(i)} \rho_{ij}(x_{jt} - x_{j0}) - \sum_{t'=1}^{t} \left( r_{i \cdot t'} - r_{i0t'} - \sum_{j \in S(i)} \rho_{ij} r_{j \cdot t'} \right) - x_{it} \leq 0 \quad (8)$$

Then, if the lead time $\tau_{ij}=0$, the second term of the left side becomes 0 and disappears from Equations (2) and (3).

Constraint on the Number of Machines Available

At most c machines can be used simultaneously. Accordingly, the following equation must be established:

$$\sum_{k \in K(i)} \delta_{it}^k \leq c \quad (9)$$

<Cost>

Two types of costs relate to scheduling problems. One of them is the setup cost $c_i^k$ occurring when the machine k is switched to the processing of the item i. The other is the echelon inventory holding cost $h_i$ occurring in proportion to the apparent inventory $x_{it}$ at the end of every timeslot t. These costs are denoted by $c_i^k (1-\delta_{it-1}^k) \delta_{it}^k$ and $h_i x_{it}$. Consequently, when the cost of the item i in the timeslot t is denoted as $f_i (\delta_i, s_i, x_i)$, the cost $f_i (\delta_i, s_i, x_i)$, i.e. a cost function for the item i is expressed by Equation (10):

$$f_i(\delta_i, s_i, x_i) = \sum_{t \in T} \left( \sum_{k \in K(i)} c_i^k (1 - \delta_{it-1}^k) \delta_{it}^k + h_i x_{it} \right) \quad (10)$$

Here, it should be noted that the cost in the timeslot t also depends on the decision variable $\delta_{it-1}^k$ for the timeslot t−1.

<Problem>

As described above, after all, the optimization problem to be dealt with corresponds to the minimization, under specified constraints, of a function value indicating the total sum of the cost $f_i (\delta_i, s_i, x_i)$ in Equation (10), i.e. a value for an objective function, for all items. Thus, the optimization problem is formulated as follows:

$$\min_{\delta} \sum_{i \in I} f_i(\delta_i, s_i, x_i) \quad (11)$$
$$s.t. \quad (4), (5), (6), (8), (9)$$

s.t. (4), (5), (6), (8), and (9) in Equation (11) indicates that the problem to be dealt with is under the constraints in Equations (4), (5), (6), (8), and (9). The constraint in Equation (4) is based on the transition equation for the remaining setup time of the machine. The constraint in Equation (5) is based on the transition equation for the inventory defined for the apparent inventory. The constraint in Equation (6) relates to machine interference. The constraint in Equation (8) is imposed to avoid a shortage of the actual work-in-process inventory, i.e. this constraint is based on the non-negative constraint equation for the actual work-in-process inventory. The constraint in Equation (9) relates to the number of machines available.

<<Solution Based on the Lagrangian Decomposition Coordination Method>>

<Dealing with Constraint Conditions>

This problem relates to Equations (2), (3), (4), (5), (6), (8), and (9) as constraint conditions. It should be noted that with the solution proposed herein, these constraint conditions are roughly classified into two types, depending on how they are dealt with. A first type includes constraint conditions incorporated in sub-programs and dealt with explicitly when the individual sub-problems are solved. A second type includes constraint conditions relating to a plurality of sub-problems as interaction constraints.

Equations (2) and (3) each express the relationship between input data and thus do not belong to either of these categories. Equations (4) and (5) are transition equations and are specific to each item. Thus, Equations (4) and (5) are essential in solving a sub-problem for each item on the basis of the dynamic programming. Consequently, these constraint conditions belong to the first type. The constraint equation (9) for the number of machines simultaneously available (at a time) is also specific to each item. Thus, Equation (9) also belongs to the first type and is also dealt with in sub-problems.

However, Equation (6) for machine interference relates to a plurality of items. Thus, Equation (6) belongs to the second type, which includes the interference constraints. Next, attention must be paid to the constraint condition (8), imposed to avoid a shortage of items. That is, if the item is final product, the third term of the left side of Equation (7) is irrelevant, the independence of processing is already established. In this case, the non-negative constraint on the inventory can be dealt with explicitly in sub-programs. On the contrary, if the item is work-in-process, the above third term is relevant. Thus, the independence of processing is impaired. In this case, the non-negative condition for the inventory cannot be dealt with in any sub-programs for the reason already described in the basic principle of the optimization scheduling. Thus, in the present embodiment, to ensure the consistency of processing, Equation (8) is treated as an interaction constraint, which belongs to the second type.

<Lagrange Functions>

The Lagrange functions shown in the equation below are derived by relaxing the interaction constraints, i.e. the machine interference constraint (6) and the non-negative constraint (8) for the work-in-process inventory.

$$L(\mu, \lambda, \delta, s, x) = \sum_{i \in I} f_i(\delta_i, s_i, x_i) + \quad (12)$$
$$\sum_{t \in T} \sum_{k \in K} \mu_t^k \left( \sum_{i \in M(k)} \delta_{it}^k - 1 \right) +$$
$$\sum_{t \in T} \sum_{i \in A} \lambda_{it} \left( \sum_{j \in S(i)} \rho_{ij}(x_{jt} - x_{j0}) - \right.$$
$$\left. \sum_{t'=1}^{t} \left( r_{i \cdot t'} - r_{i0t'} - \sum_{j \in S(i)} \rho_{ij} r_{j \cdot t'} \right) - x_{it} \right)$$

In this equation, $\mu_t^k$ and $\lambda_{it}$ denote Lagrange multiplier indicating the penalty costs (line fees) corresponding to the interference constraint condition (6) and the non-negative condition (8) for the work-in-process inventory, respectively. In this case, $\mu_t$ is a vector having elements $\mu_t^l$ and $l \in K(i)$, where $\mu=(\mu_1, \ldots, \mu_t, \ldots \mu_{nt})$ Likewise, $\lambda_i$ is an vector. $\lambda_i=(\lambda_{i1}, \ldots, \lambda_{it}, \ldots \lambda_{int})$ and $\lambda=(\lambda_1, \ldots, \lambda_i, \ldots, \lambda_{nt})$.

<Lagrangian Problem>

In the end, the problem in Equation (11), described above and to which Equations (2), (3), (5), (6), (8), and (9) are related, is equivalent to the Lagrangian problem shown in Equation (13), described above. Of the constraint conditions (2), (3), (4), (5), (6), (8), and (9), which relate to Equation (11), the constraint conditions (4), (5), and (9) are imposed on Equation (13).

$$\max_{\mu,\lambda} \min_{\delta} \; L(\mu, \lambda, \delta, s, x) \tag{13}$$

$$st. \quad (4), (5), (9)$$

Here, to decompose the problem into items, Equation (12) is first rearranged for the item i. Then, the following Lagrange function is derived:

$$L_i(\mu, \lambda_i, \delta_i, s_i, x_i) = \tag{14}$$

$$f_i(\delta_i, s_i, x_i) + \sum_{t \in T} \sum_{k \in K(i)} \mu_t^k \delta_{it}^k - \sum_{t \in T} \left( \lambda_{it} a(i) - \sum_{j \in P(i)} \lambda_{jt} \rho_{ji} \right) x_{it}$$

Here, provided that a(i) is expressed as 1 if the item i is succeeded by another item (that is, the item i can be used as a work-in-process) and otherwise as 0, Equation (14) can be expressed as follows:

$$L(\mu, \lambda, \delta, s, x) = \sum_{i \in I} L_i(\mu, \lambda_i, \delta_i, s_i, x_i) - \sum_{t \in T} \sum_{k \in K} \mu_t^k - \tag{15}$$

$$\sum_{t \in T} \sum_{i \in A} \lambda_{it} \left( \sum_{j \in S(i)} \rho_{ij} x_{j0} + \sum_{t'=1}^{t} \left( r_{i \cdot t'} - r_{i0t'} - \sum_{j \in S(i)} \rho_{ij} r_{j \cdot t'} \right) \right)$$

<Sub-Optimization Problem>

On the basis of Equation (15), for given $\mu$ and $\lambda$, the problem expressed by Equation (11) can be decomposed into the following sub-problems (sub-optimization problems):

$$\min_{\delta_i} \; L_i(\mu, \lambda_i, \delta_i, s_i, x_i) \tag{16}$$

$$s.t. \quad (4), (5), (9)$$

For the given $\mu$ and $\lambda$, the sub-optimization problem for the item i shown by Equation (16) can be solved independently of the other items. This solution will be described later.

<Coordination of Lagrange Multipliers>

In the present embodiment, two types of Lagrange multiplier, $\mu_t^k$ and $\lambda_{it}$, are used. Thus, updating the Lagrange multipliers during the v-th repeated computation requires update rules for the Lagrange function used to eliminate machine interference and for the Lagrange function used to maintain a sufficient work-in-process inventory.

Update rule for the Lagrange multiplier used to eliminate mechanical interference:

The equation shown below indicates the update rule for the Lagrange multiplier used to eliminate mechanical interference.

$$\mu_t^{kv} = \mu_t^{kv-1} + \max\left\{0, \alpha\left(\sum_{i \in M(k)} \delta_{it}^{kv} - 1\right)\right\} \tag{17}$$

Update rules for the Lagrange function used to maintain a sufficient work-in-process inventory:

The equation shown below indicates the update rules for the Lagrange function used to maintain a sufficient work-in-process inventory.

$$\lambda_{it}^v = \lambda_{it}^{v-1} + \max\left\{0, \beta\left(\sum_{j \in S(i)} \rho_{ij}(x_{jt}^v - x_{j0}) - \sum_{t'=1}^{t}\left(r_{i \cdot t'} - r_{i0t'} - \sum_{j \in S(i)} \rho_{ij} r_{j \cdot t'}\right) - x_{it}^v\right)\right\} \tag{18}$$

In Equation (18), $\alpha$ and $\beta$ denote scalar step sizes. Values for $\alpha$ and $\beta$ are numerically determined through trial and error. In this case, $\alpha$ and $\beta$ may depend on k (machine) and i (item), respectively.

<<Dynamic Programming for the Sub-optimization Problem>>

Now, description will be given of a method of solving the sub-optimization problem shown by Equation (16), by reformulating it into a dynamic programming.

<Admissible States>

The decision $\delta_{it}^k$ that is admissible during the timeslot t does not only depend on the inventory state x in the preceding timeslot t−1. That is, $\delta_{it}^k$ also depends on the states of all machines available during the preceding timeslot t−1 and the remaining setup time $s_{it-1}^k$ in the same timeslot t. FIG. 5 schematically shows the relationship observed in a state transition from $(\delta_{it-1}^k, s_{it-1}^k)$ to $(\delta_{it}^k, s_{it}^k)$. The circles in the FIG. indicate that decisions are present which are permissible in connection with the state in the timeslot t−1. The crosses in the FIG. indicate that no such decisions are present.

Figure 6:
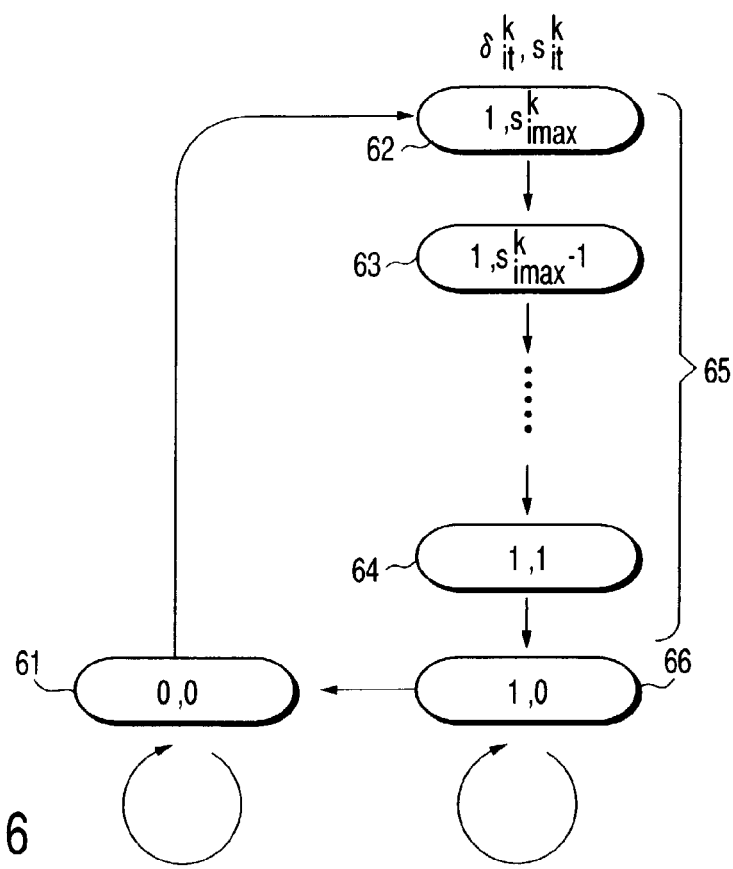
FIG. 6 is a diagram showing a state transition in $(\delta_{it}^k, s_{it}^k)$.

FIG. 6 shows a state transition in this ($\delta it^k$, $sit^k$). In FIG. 6, in an admissible transition, a state (0, 0) 61 can shift to either the same state 61 or a state (1, $s_{imax}^k$) 62 during the next timeslot. The state 61 indicates that the machine k is idle. Further, the state 62 indicates the time when the item is switched, i.e. the start of setup. In an admissible transition, the state 62, i.e. the state (1, $s_{imax}^k$) 62 can shift only to a state (1, $s_{imax}^k-1$) 63 during the next timeslot.

The state 63 indicates that one timeslot has elapsed since the start of setup and the remaining setup time is $s_{imax}^k-1$. Subsequently, similarly, every time one timeslot elapses, only $s_{it}^k$ of ($\delta_{it}^k$, $s_{it}^k$) decreases by 1 with $\delta_{it}^k$ remaining at 1. Then, ($\delta_{it}^k$, $s_{it}^k$) shifts to a state (1, 1) 64. The state 64 indicates that the remaining setup time is 1 (corresponding to one timeslot) and that the setup operation is about to complete. The time from state 62 to state 64 corresponds to a setup period 65. In an admissible transition, the state 64, i.e. the state (1, 1) 64 can shift only to a state (1, 0) 66. The state (period) 65 indicates that production is in progress. In an admissible transition, a state 66, i.e. a state (1, 0) 66 can shift to either the state 66 or the state (0, 0) 61.

<Optimal Cost Function and Its Computation>

Now, description will be given of an optimal cost function and its computation. In the present embodiment, the optimal cost function is expressed as $V_t(\delta_{it}, s_{it}, x_{it}, \mu, \lambda_i)$ for given Lagrange functions $\mu$ and $\lambda$. This optimal cost function $V_t$ is defined as the sum of costs occurring in connection with optimal decisions made during the timeslots 0 to t. During the timeslot t, a decision variable (a machine setting state), the remaining setup time, and the inventory state (the inventory at the end of the timeslot) are defined as $\delta_{it}, s_{it}$, and $x_{it}$, respectively, for the item i.

Importantly, the optimal cost function contains, as the vector of a state variable, the vector $\delta_{it}$ of the decision variable as well as the vector $s_{it}$ and the variable $x_{it}$. That is, the decision variable $\delta_{it}$ also plays the role of the state variable. This is attributed to the dependence of a setup cost occurring during the timeslot t on the decision in the timeslot t−1. In other words, information on the preceding timeslot t−1 is required to compute the cost occurring during the timeslot t. In this case, the optimal cost function can be expressed by a recursive relation expression based on the dynamic programming.

$$V_0(\delta_{i0}, s_{i0}, x_{i0}, \mu, \lambda_i) = \begin{cases} 0, & \text{(for given } \delta_{i0}, x_{i0}, \text{ and } s_{i0}) \\ +\infty, & \text{(other cases)} \end{cases} \quad (19)$$

For $\forall t \in T$, when $0 \le x_{it-1} \le x_{i\max}$, $$V_t(\delta_{it}, s_{it}, x_{it}, \mu, \lambda_i) = \quad (20)$$

$$\min_{\delta_{it-1}, s_{it-1}} \begin{Bmatrix} \sum_{k \in K(i)} c_{it}^k (1 - \delta_{it-1}^k) \delta_{it}^k + h_i x_{it} + \\ \sum_{k \in K(i)} \mu_t^k \delta_{it}^k + \left( \lambda_{it} a(i) - \sum_{j \in P(i)} \lambda_{jt} \rho_{ji} \right) x_{it} + \\ V_{t-1}(\delta_{it-1}, s_{it-1}, x_{it-1}, \mu, \lambda_i) \end{Bmatrix}$$

Here, when $x_{it-1}$ is not within a permissible range, $V_t(\delta_{it}, s_{it}, x_{it}, \mu, \lambda_i)$ is always $+\infty$ for arbitrary $\delta_{it-1}^k$ and $s_{it-1}^k$. In this case, it is assumed that $\delta_{it-1}^*(\delta_{it}, s_{it}, x_{it}, \mu, \lambda_i)$ denotes the optimal decision in Equation (20).

If $s_{it}^l=0$ ($l \in K(i)$), a value for the optimal cost function in the timeslot t−1 is determined by finding $s_{it-1}^k$ and $x_{it-1}$ on the basis of Equations (4) and (5), described previously, for given $\delta_{it}^l, s_{it}^l$ ($l \in K(i)$), $x_{it}, \mu$, and $\lambda_i$, and for the selected decision $\delta_{it-1}^l$ ($l \in K(i)$). However, if $s_{it}^l=0$, it is impossible to determine whether the state of $s_{it-1}^l$ in the timeslot t−1, which shifts to the state $s_{it}^l=0$, is 0 or 1. Thus, to deal with this, the minimum value (min), shown in Equation (20), described above, is used not only for $\delta_{it-1}$ but also for $s_{it-1}$. On the other hand, all costs occurring during the timeslot t have been determined. Consequently, Equation (20), described above, can be computed.

<Decision of the Optimal Solution>

Now, it is assumed that, for the item i, the optimal cost function value $V_t(\delta_{it}, s_{it}, x_{it}, \mu, \lambda_i)$ and the optimal decision, i.e. $\delta_{it-1}^*(\delta_{it}, s_{it}, x_{it}, \mu, \lambda_i)$ have been determined for each timeslot t (t=1, ..., $n_t$). Further, it is assumed that $V_t(\delta_{it}, s_{it}, x_{it}, \mu, \lambda_i)$ and $\delta_{it-1}^*(\delta_{it}, s_{it}, x_{it}, \mu, \lambda_i)$ for the item i in timeslot have been stored in a memory (in this case, a cost storage area 223) in table form. Furthermore, it is assumed that, for $s_{it}^l=0$ ($l \in K(i)$), the optimal remaining setup time $s_{it-1}^*(\delta_{it}, s_{it}, x_{it}, \mu, \lambda_i)$ has been similarly stored in the memory. With reference to the flow chart in FIG. 4, description will be given of a procedure of finding the optimal solution for the item in this case, i.e. determining a schedule and a state transition.

First, one of all combinations $(\delta_{it}, s_{it}, x_{it})$ of $\delta_{it}, s_{it}$, and $x_{it}$ admissible during the timeslot $t=n_t$ is determined which minimizes the value for $V_t(\delta_{it}, s_{it}, x_{it}, \mu, \lambda_i)$ Then, this combination $\delta_{it}, s_{it}, x_{it}$ is determined to be the optimal solution (steps 405 and 406). This optimal solution $\delta_{it}, s_{it}, x_{it}$ is set as $\delta_{it}^*, s_{it}^*, x_{it}^*$. Then, the optimal decision $\delta_{it-1}^*(\delta_{it}^*, s_{it}^*, x_{it}^*)$ for $\delta_{it}^*, s_{it}^*, x_{it}^*$ is identified (step 407). The combination $\delta_{it}^*, s_{it}^*, x_{it}^*$ is substituted into Equations (4) and (5), described previously, to determine $s_{it-1}^*$ and $x_{it-1}^*$ (step 408). It is also possible to determine $s_{it-1}^*$ and $x_{it-1}^*$ from $\delta_{it}^*, s_{it}^*, x_{it}^*$ and $\delta_{it-1}^*(\delta_{it}, s_{it}, x_{it}, \mu, \lambda_i)$ for the item i in each timeslot, stored in the cost storage area 223 in table form.

Then, t is decremented by 1 (step 409). If the decremented t is not smaller than 1 (step 410), then step 406 and the subsequent process steps are executed on this value. This operation is repeated until t=1 (step 410).

Thus, description has been given of the basic principle of the optimization scheduling applied in the present embodiment, the details of the formulation in the basic principle, the solution based on the Lagrangian decomposition coordination method, and the dynamic programming for sub-optimization problems.

<Implementation of Optimization Scheduling>

Now, an implementation of the above described optimization scheduling will be described. The scheduling apparatus in FIG. 1 carries out the above described optimization scheduling by applying its basic principle. Thus, the scheduling apparatus comprises an optimizing section 11, an inventory extracting section 12, a remaining setup time extracting section 13, a machine interference determining section 14, a machine interference control section 15, a schedule generating section 16, a main control section 17, a sufficiency determining section 18, and an inventory control section 19. These sections 11 to 19 are functional elements implemented by the CPU 21 in the computer in FIG. 2 by executing the optimization scheduling program 241.

The optimizing section 11 performs an operation of solving the sub-optimization problem in Equation (16) for each item i independently of the other items, to find the solution. In this case, the optimizing section 11 uses the optimal cost function in Equation (20) to solve the sub-optimization problem under the constraints on the transitions of the inventory and the remaining setup time. The inventory extracting section 12 extracts the inventory, required for the operation of the optimizing section 11. The remaining setup time extracting section 13 extracts the remaining setup time, required for the operation of the optimizing section 11.

The machine interference determining section 14 determines whether or not machine interference is considered to have been eliminated, on the basis of the solution for each item i found by the optimizing section 11. If machine interference has not been eliminated, the machine interference control section 15 controls the optimizing section 11 so as to reduce the magnitude of machine interference. Specifically, the machine interference control section 15 updates the Lagrange multiplier ($\mu_t^k$) in the optimal cost function, used by the optimizing section 11, the multiplier ($\mu_t^k$) being required to control (coordinate) machine interference.

The sufficiency determining section 18 determines whether or not the work-in-process inventory is sufficient, on the basis of the solution for the item i found by the optimizing section 11. If the work-in-process inventory is not sufficient, i.e. it runs short, then the inventory control section 19 controls the optimizing section 11 so as to make the work-in-process inventory sufficient. Specifically, the inventory control section 19 updates the Lagrange multiplier ($\lambda_{it}$) in the optimal cost function, used by the optimizing section 11, the multiplier ($\lambda_{it}$) being required to control (coordinate) the sufficiency of the work-in-process.

If it is determined that machine interference and a shortage of the work-in-process inventory have been eliminated, the schedule generating section 16 uses the already found solution to generate a production schedule. The main control section 17 controls the entire scheduling apparatus.

The main memory 22 is provided with a production data storage area 221, a required shipment storage area 222, and a cost storage area 223. The area 221 is used to store production data. The production data contains data $p_i^k$, $s_{imax}^k$, $s_{i0}^k$, $\delta_{i0}^k$, and $c_i^k$ for each item i and each machine k, data $x_{i0}$, $\rho_{ij}$, $h_i$, and $\tau_{ij}$ for each item i, and data $r_{ijt}$ and $r_{i,t}$ for each item i in each timeslot t. The area 222 is used to store requested shipment data. The requested shipment data contains riot for each item i in each timeslot t. The area 223 is used to store, in table form, the sum of costs $V_t$ ($\delta_{it}$, $s_{it}$, $x_{it}$, $\mu$, $\lambda_i$) for a period ending with the timeslot t, computed by the optimizing section 11, and $f_{it}^*$, $s_{it}^*$, and $x_{it}^*$ corresponding to the sum of costs $V_t$ ($\delta_{it}$, $s_{it}$, $x_{it}$, $\mu$, $\lambda_i$). In this case, an area can be separately provided to store $\delta_{it}^*$, $s_{it}^*$, and $x_{it}^*$.

The main memory 22 is further provided with an intermediate-result storage area 224, a final-result storage area 225, and a schedule storage area 226. The area 224 is used to store the intermediate results of solutions to optimal sub-problems obtained by the optimizing section 11. The area 225 is used to store the final results of solutions to optimal sub-problems obtained by the optimizing section 11. The area 226 is used to store a production schedule generated by the schedule generating section 16.

Figure 3:
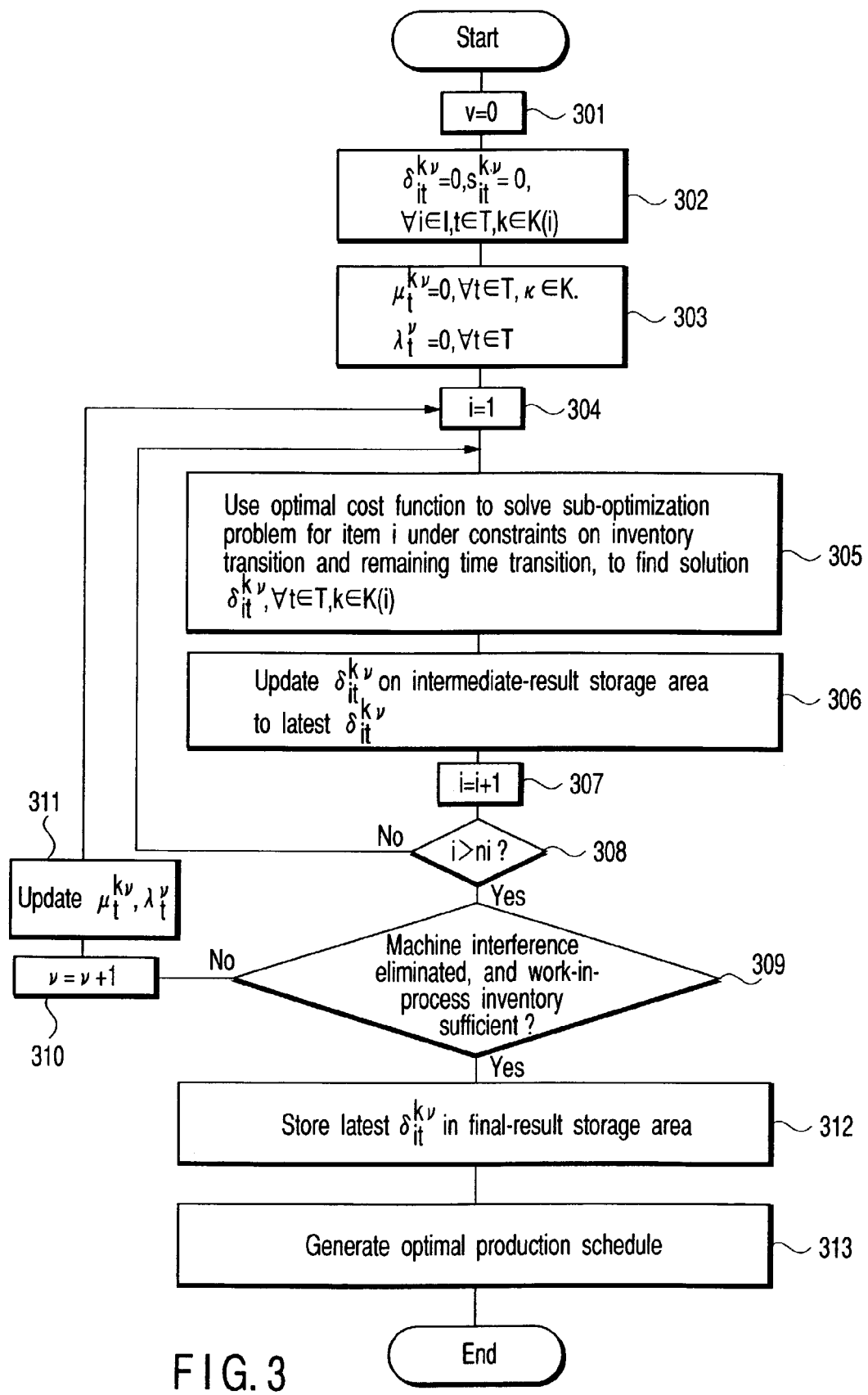
FIG. 3 is a flow chart illustrating operations of the scheduling apparatus in FIG. 1.

Now, operations of the configuration in FIG. 1 will be described with reference to the flow chart in FIG. 3. First, to make out an optimal production schedule using the scheduling apparatus in FIG. 1, it is necessary to input beforehand production data containing data $p_i^k$, $s_{imax}^k$, $s_{i0}^k$, $\delta_{i0}^k$, and $c_i^k$ for each item i and each machine k, data $x_{i0}$, $\rho_{ij}$, $h_i$, and $\tau_{ij}$ for each item, and data $r_{ijt}$ and $r_{i,t}$ for each item i in each timeslot t. In this case, the production data is input, for example, in table form by an operator by operating the keyboard 25. The production data can be externally input via a communication line.

The input production data is stored in the production data storage area 221 in the main memory under the control of the main control section 17. The production data stored in the area 221 is saved to the HDD 23 for reuse. Further, whenever it becomes necessary to generate a production schedule, requested shipment data containing $r_{i0t}$ for each item i in the specified timeslot t is input and stored in the requested shipment storage area 222 in the main memory 22.

In this case, it is assumed that the planning horizon is two weeks and that production is carried out for seven hours a day on three shifts. Further, it is assumed that the timeslot width is set at 30 minutes. In this case, the number T of timeslots contained in the entire planning horizon is 588. That is, in the present embodiment, inputting requested shipment data causes 588 timeslots in 30-minute increments to be set in the planning horizon. A resolution for an optimization problem (mathematical model) can be increased by reducing this increment, i.e. one timeslot period. The computations amount only to the first order of the number of increments (the number of timeslots). Accordingly, the operator should not be too afraid to reduce the increment. That is, even if the increment is reduced to half, computation time only doubles. Of course, the increment need not be significantly reduced. No practical problems are created provided that the increment is reduced to the extent that round-off errors are negligible.

In this state, when an instruction to start scheduling is input from the keyboard 25, the main control section 17 executes an initialization process. During the initialization process, the number of repetitions (repetition number) v is set at an initial value 0 (step 301). Further, the decision variables $\delta_{it}^{kv}$ and $s_{it}^{kv}$ for each item i ($i \in I(1, 2, \ldots, n_i)$), each timeslot t ($t \in T(1, 2, \ldots, n_t)$), and each machine k ($k \in K(1, 2, \ldots, n_k)$) are set at 0 (step 302). Furthermore, the Lagrange multiplier $\mu_t^{kv}$ for each timeslot t ($t \in T(1, 2, \ldots, n_t)$ and each machine k ($k \in K(1, 2, \ldots, n_k)$) is set at 0 (step 303). In step 303, the Lagrange multiplier $\lambda_t^v$ for each timeslot t ($t \in T(1, 2, \ldots, n_t)$) is also set at 0.

After executing steps 301 to 303, the main control section 17 activates the optimizing section 11. The optimizing section 11 first initializes the item i at 1 (step 304). Then, the optimizing section 11 solves the sub-optimization problem shown in Equation (16) for the item i, under the constraints of the remaining setup time transition equation (4) and the inventory transition equation (5) (step 305). In this case, the optimal cost function in Equation (20) is used to solve the sub-optimization problem. Further, as a result of the solution of the sub-optimization problem, the solution $\delta_{it}^{kv}$ ($\forall t \in T$, $k \in K(i)$) for each timeslot is found for the item i and for each machine k available for processing of the item i.

Figure 4:
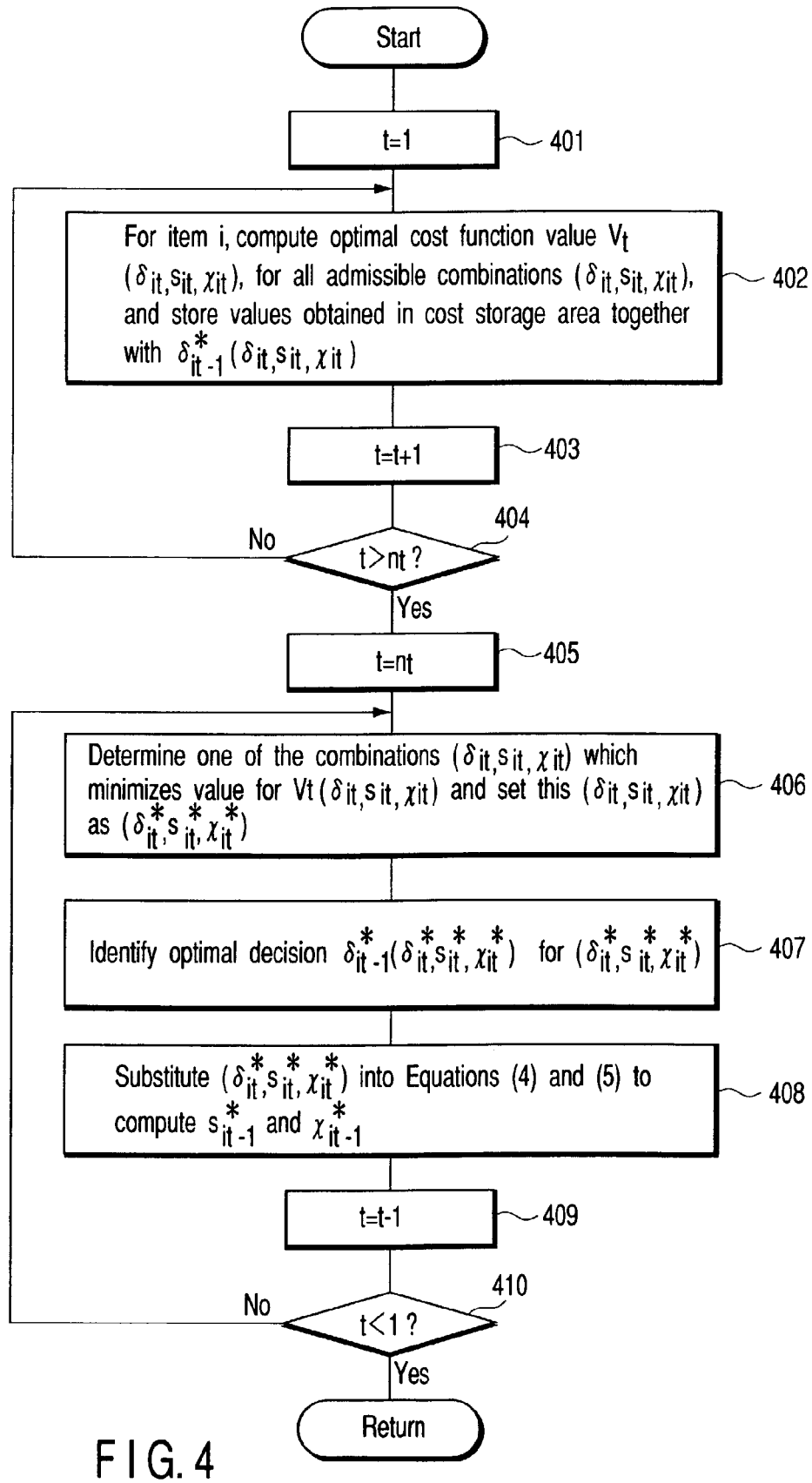
FIG. 4 is a flow chart illustrating a detailed procedure executed in step 305 in FIG. 3.

FIG. 4 shows the detailed procedure of step 305. In this step, to solve the sub-optimization problem for the item i, the optimizing section 11 determines the optimal cost function value $V_t$ ($\delta_{it}$, $s_{it}$, $x_{it}$, $\mu$, $\lambda_i$) and optimal decision $\delta_{it-1}^*$ ($\delta_{it}$, $s_{it}$, $x_{it}$), described below. Thus, the optimizing section 11 first sets the timeslot t at 1 (step 401). Then, the optimizing section 11 computes the optimal cost function value $V_t$ ($\delta_{it}$, $s_{it}$, $x_{it}$, $\mu$, $\lambda_i$) for all admissible (feasible) combinations of ($\delta_{it}$, $s_{it}$, $x_{it}$) (step 402). This optimal cost function value is computed within the range ($k \in K(i)$) of the machines k available for processing (production) of the item i using the optimal cost function in Equation (20). In step 402, the computed optimal cost function values $V_t$ ($\delta_{it}$, $s_{it}$, $x_{it}$, $\mu$, $\lambda_i$) are stored in the cost storage area 223 in table form together with the corresponding optimal decision $\delta_{it-1}^*$ ($\delta_{it}$, $s_{it}$, $x_{it}$).

Then, the optimizing section 11 increments t by 1 (step 403). If the incremented t is not larger than $n_t$ (step 404), the optimizing section 11 executes the processing in steps 402 and 403, described above, on the incremented t. The processing in steps 402 and 403 is repeated until t=$n_t$ (step 404).

Then, once the incremented t exceeds $n_t$, the optimizing section 11 sets t to $n_t$ (step 405). Then, the optimizing section 11 moves through optimal costs $V_t$ ($\delta_{it}$, $x_{it}$, $s_{it}$) on the cost storage area 223 in the reverse direction from t=$n_t$. That is, as described previously, the optimizing section 11 first searches for one of combinations ($\delta_{it}$, $s_{it}$, $x_{it}$) of $\delta_{it}$, $s_{it}$, and $x_{it}$ admissible during the timeslot t=$n_t$ which minimizes the value (optimal cost) for $V_t$ ($\delta_{it}$, $s_{it}$, $x_{it}$, $\mu$, $\lambda_i$) and sets this combination ($\delta_{it}$, $s_{it}$, $x_{it}$) as an optimal solution $\delta_{it}^*$, $s_{it}^*$, $x_{it}^*$ (step 406).

Then, the optimizing section 11 identifies the optimal decision $\delta_{it-1}^*$ ($\delta_{it}^*$, $s_{it}^*$, $x_{it}^*$) for $\delta_{it}^*$, $s_{it}^*$, and $x_{it}^*$ (step 407). The optimizing section 11 uses this $\delta_{it}^*$, $s_{it}^*$, and $x_{it}^*$ to determine $s_{it-1}^*$ and $x_{it-1}^*$ in the timeslot t-1 preceding the timeslot with the optimal cost $V_t$ (step 408). In this case, $s_{it-1}^*$ and $x_{it-1}^*$ are determined by substituting $\delta_{it}^*$, $s_{it}^*$, and $x_{it}^*$ into Equations (4) and (5), described previously. However, as described previously, it is also possible to determine $s_{it-1}^*$ and $x_{it-1}^*$ on the basis of $\delta_{it-1}^*$ ($\delta_{it}$, $s_{it}$, $x_{it}$, $\mu$, $\lambda_i$) for the item i in each timeslot, stored in the cost storage area 223 in table form. The optimizing section 11 repeats steps 406 to 408, described above, while decrementing t by 1 (step 409). This is repeated until t=1 (step 410).

In this manner, the optimizing section 11 determines $\delta_{it}^{kv}$ (t=1, ..., $n_t$, k∈K(i)) that provides the item i with the optimal cost (step 305). Then, the optimizing section 11 updates $\delta_{it}^{kv}$ on the intermediate-result storage area 224 to the latest $\delta_{it}^{kv}$ determined (step 306).

Then, the optimizing section 11 increments i by 1 (step 307). If the incremented i is not larger than $n_i$, the optimizing section 11 determines that there remain unprocessed items. In this case, the optimizing section 11 executes steps 305 to 307, described above, on the item i denoted by the incremented i.

Then, once the incremented i exceeds $n_i$, the optimizing section 11 determines that the solution $\delta_{it}^{kv}(\forall i \in I, t \in T, k \in K(i))$ has been found for all items i=1, ..., $n_i$. In this case, the optimizing section 11 activates the machine interference determining section 14 and the sufficiency determining section 18.

The machine interference determining section 14 computes, for each machine k, a machine interference number indicating the number of superimpositions of the timeslot with $\delta_{it}^{k}=1$ among the different types of items i, on the basis of the solutions 67 $_{it}^{kv}$ for all items i (i∈M(i)) processed (produced) by the machine k. In this case, an average machine interference number is computed. This average machine interference number is computed by dividing the total sum of the machine interference number for all items and the entire period (entire planning horizon) with the repetition number v for all machines by $n_t \times n_k$ (the number of all timeslots×the number of all machines). The determining section 14 determines whether or not machine interference is considered to have been eliminated, by determining whether or not the computed machine interference number (average machine interference number) is smaller than a predetermined threshold (step 309).

On the other hand, the sufficiency determining section 18 determines, for all items i (i∈I(1, 2, ..., $n_i$), the total number of timeslots during which the work-in-process inventory has a minus value (that is, the non-negative condition is not met). In step 309, described above, the determining section 18 determines whether the work-in-process inventory is sufficient, on the basis of the total number of timeslots determined. Specifically, the determining section 28 determines, for all items, the total number of timeslots during which the work-in-process inventory has a minus value. The rate of sufficiency of an average work-in-process inventory is determined by dividing the total number of timeslots by $n_i \times n_t$ (the total number of items×the total number of timeslots). Then, whether or not the work-in-process inventory is sufficient is determined by determining whether or not the above rate is smaller than a predetermined threshold. In this case, each work-in-process inventory is computed according to Equation (8), described previously, using $x_{it}$ combined with the corresponding solution $\delta_{it}^{kv}$ determined in step 305.

If at least one of the condition that machine interference has been eliminated and the condition that the work-in-process inventory is sufficient is not met, the number of repetitions (iterations) v is incremented by 1 (step 310).

Then, at least one of the machine interference control section 15 and the inventory control section 19 is activated. In this case, if machine interference has not been eliminated, the machine interference control section 15 is activated. On the other hand, if the work-in-process inventory is insufficient, the sufficiency determining section 18 is activated. If neither conditions are met, both machine interference control section 15 and sufficiency determining section 18 are activated.

When activated, the machine interference control section 15 updates (coordinates) the Lagrange multiplier $\mu_t^{kv}$, used for machine interference, according to Equation (17), described previously, and notifies the optimizing section 11 of this (step 311). On the other hand, when activated, the sufficiency determining section 18, at step 311, described above, updates (coordinates) the Lagrange multiplier $\mu_t^v$, used to make the work-in-process inventory sufficient, according to Equation (18), described previously, and notifies the optimizing section 11 of this.

Then, the optimizing section 11 uses the updated Lagrange multiplier $\mu_t^{kv}$ and/or the updated Lagrange multiplier $\lambda_t^v$ to repeatedly execute steps 305 to 307 for each item (step 308). This allows the item- and machine-based solution $\delta_{it}^{kv}$ to be found for each timeslot. Then, it is assumed that, at step 309, described above, the machine interference determining section 14 determines that machine interference is considered to have been eliminated. Further, it is assumed that, at step 309, the sufficiency determining section 18 determines that the work-in-process inventory is sufficient. Then, the corresponding item- and machine-based solutions $\delta_{it}^{kv}$ are stored in the final-result storage area 225, and the schedule generating section 16 is activated (step 312).

The schedule generating section 16 generates a production schedule on the basis of the item- and machine-based solutions $\delta_{it}^{kv}$, and stores it in the schedule storage area 226 (step 313). As described previously, the item- and machine-based solution $\delta_{it}^{kv}$ is represented by the 0-1 variable. Thus, on a production schedule, in each timeslot t provided on the time axis and for each item i and each machine k, the solution $\delta_{it}^{kv}$ is 1 if the item i is processed (set up or produced) during this timeslot by the machine k. Otherwise, the solution $\delta_{it}^{kv}$ is 0. Accordingly, item- and machine-based lot sizes and the temporal positions of the lots can be generated on the basis of a list of 1 in the solutions $\delta_{it}^{kv}$ and their temporal positions. The temporal positions of the lots provide information used to determined their sequence in a feasible schedule. That is, in the present embodiment, the lot size and the lot sequence can be simultaneously generated once, as a solution (schedule) for the items, the solution $\delta_{it}^{kv}$ is found which allows the determining sections 14 and 18 to determine that machine interference is considered to have been eliminated and that the work-in-process inventory is sufficient, respectively.

The production schedule stored in the schedule storage area 226 is shown on the display 26 in FIG. 2 and is output as a print by a printer device (not shown in the drawings) automatically or in response to a print instruction input from the keyboard 25. Further, this production schedule can be used as control information for a production line as it is or after a predetermined data conversion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-item multi-process lot size scheduling method in which a computer generates a production schedule applied to a multi-item multi-process production system that uses a plurality of machines to process items corresponding to a plurality of steps during these steps, at least one machine or process enabling the items to be switched in connection with setup, the method comprising:
  solving an item-based one-dimensional sub-optimization problem independently of the other items, the problem being under a first constraint on machine interference between items and a second constraint that limits a work-in-process inventory to a non-negative value, the problem corresponding to a multi-item multi-process scheduling problem and being solved to make out a schedule for each item processed using the corresponding process;
  carrying out coordination required to meet the first and second constraints on the basis of an item-based solution found in the solving;
  causing the solving to be reexecuted every time the coordinating is executed; and
  generating a production schedule on the basis of the item-based solution found in the solving when the first and second constraints are met.

2. The multi-item multi-process lot size scheduling method according to claim 1, wherein, for the item-based one-dimensional optimization problem, a total cost is optimized which includes a first penalty cost corresponding to the first constraint and a second penalty cost corresponding to the second constraint.

3. The multi-item multi-process lot size scheduling method according to claim 2, further comprising:
  determining whether the first constraint is met, on the basis of the level of the machine interference in the same machine between the items for the item-based solution found at the solving; and
  determining whether the second constraint is met, on the basis of the work-in-process inventory for the item-based solution found at the solving, and
  wherein in the coordinating, if it is determined, at the determining whether the first constraint is met, that the first constraint is not met, then the first penalty cost is updated so as to reduce the level of the machine interference, and if it is determined, at the determining whether the second constraint is met, that the second constraint is not met, then the second penalty cost is updated so as to make the work-in-process inventory sufficient.

4. The multi-item multi-process lot size scheduling method according to claim 1, wherein, for the one-dimensional sub-optimization problem, the first constraint is relaxed by weighting with a first Lagrange multiplier, and the second constraint is relaxed by weighting with a second Lagrange multiplier.

5. The multi-item multi-process lot size scheduling method according to claim 4, further comprising:
  determining whether the first constraint is met, on the basis of the level of the machine interference in the same machine between the items for the item-based solution found at the solving; and
  determining whether the second constraint is met, on the basis of the work-in-process inventory for the item-based solution found at the solving step, and
  wherein in the coordinating, if it is determined, at the determining whether the first constraint is met, that the first constraint is not met, then the first Lagrange multiplier is updated so as to reduce the level of the machine interference, and if it is determined, at the determining whether the second constraint is met, that the second constraint is not met, then the second Lagrange multiplier is updated so as to make the work-in-process inventory sufficient.

6. The multi-item multi-process lot size scheduling method according to claim 5, wherein, in the solving, for each item and each machine and for respective timeslots into which a planning horizon is divided at preset time intervals, a decision variable is obtained as a solution, the decision variable indicating whether the timeslot is used by the machine in order to produce the item.

7. The multi-item multi-process lot size scheduling method according to claim 6, wherein the first constraint is an interaction constraint that can indicate that, of item- and machine-based decision variables in an arbitrary timeslot, only a decision variable for at most one item is used for the same machine.

8. The multi-item multi-process lot size scheduling method according to claim 7, wherein, in the solving, the decision variable for the item i in an arbitrary timeslot t is defined as $\delta_{it}$, the first Lagrange multiplier is defined as $\mu$, the second Lagrange multiplier is defined as $\lambda_i$, a state of an apparent inventory which is used in place of an accumulated shipment actually delivered to a next process at the end of the timeslot t and which is computed using the accumulated amount of the item i obtained by exploding outer demands in timeslots ending with the timeslot t into the item i in the timeslot t is defined as a state variable $x_{it}$, remaining setup time required for setup for the item i is defined as $s_{it}$, and the one-dimensional sub-optimization problem is solved using an optimal cost function $V_i(\delta_{it}, x_{it}, \mu, \lambda_i)$ indicating the sum of costs occurring in connection with optimal decisions made during the timeslots ending with the timeslot t.

9. The multi-item multi-process lot size scheduling method according to claim 8, wherein the cost computed using the optimal cost function includes a first penalty cost corresponding to a machine fee computed on the basis of the first Lagrange multiplier $\mu$, a second penalty cost corresponding to a machine fee computed on the basis of the second Lagrange multiplier $\lambda i$, and a cost determined by the state variable $x_{it}$ and an echelon inventory holding cost $h_i$ per timeslot for a value newly added as a result of processing of the item i.

10. A program tangibly embodied on a computer-readable medium for multi-item multi-process lot size scheduling in a multi-item multi-process production system that uses a plurality of machines to process items corresponding to a plurality of steps during these steps, at least one machine or process enabling the items to be switched in connection with setup, the program enabling a computer to execute:
  solving an item-based one-dimensional sub-optimization problem independently of the other items, the problem being under a first constraint on machine interference between items and a second constraint that limits a work-in-process inventory to a non-negative value, the problem corresponding to a multi-item multi-process scheduling problem and being solved to make out a schedule for each item processed using the corresponding process;
  carrying out coordination required to meet the first and second constraints on the basis of an item-based solution found in the solving;

causing the solving to be reexecuted every time the coordinating is executed; and generating a production schedule on the basis of the item-based solution found in the solving when the first and second constraints are met.

11. An article of manufacture comprising a computer-usable medium having computer-readable program code means embodied therein, for multi-item multi-process lot size scheduling in a multi-item multi-process production system that uses a plurality of machines to process items corresponding to a plurality of steps during these steps, at least one machine or process enabling the items to be switched in connection with setup, the computer-readable program code means in the article of manufacture comprising:

the computer-readable program code means comprising for solving an item-based one-dimensional sub-optimization problem independently of the other items, the problem being under a first constraint on machine interference between items and a second constraint that limits a work-in-process inventory to a non-negative value, the problem corresponding to a multi-item multi-process scheduling problem and being solved to make out a schedule for each item processed using the corresponding process;

the computer-readable program code means comprising for carrying out coordination required to meet the first and second constraints on the basis of an item-based solution found in the solving;

the computer-readable program code means comprising for causing the solving step to be reexecuted every time the coordinating is executed; and the computer-readable program code means comprising for generating a production schedule on the basis of the item-based solution found in the solving when the first and second constraints are met.

12. A multi-item multi-process lot size scheduling apparatus that generates a production schedule applied to a multi-item multi-process production system that uses a plurality of machines to process items corresponding to a plurality of steps during these steps, at least one machine or process enabling the items to be switched in connection with setup, the apparatus comprising:

optimizing means for solving an item-based one-dimensional sub-optimization problem independently of the other items, the problem being under a first constraint on machine interference between items and a second constraint that limits a work-in-process inventory to a non-negative value, the problem corresponding to a multi-item multi-process scheduling problem and being solved to make out a schedule for each item processed using the corresponding process;

machine interference control means for carrying out coordination required to meet the first constraint on the basis of an item-based solution found by the optimizing means;

inventory control means for carrying out coordination required to meet the second constraint on the basis of the item-based solution found by the optimizing means; and schedule generating means for generating a production schedule on the basis of the item-based solution found by the optimizing means when the first and second constraints are met.

13. The multi-item multi-process lot size scheduling apparatus according to claim 12, wherein, for the item-based one-dimensional optimization problem, a total cost is optimized which includes a first penalty cost corresponding to the first constraint and a second penalty cost corresponding to the second constraint.

14. The multi-item multi-process lot size scheduling apparatus according to claim 13, further comprising:

machine interference determining means for determining whether the first constraint is met, on the basis of the level of the machine interference in the same machine between the items for the item-based solution found by the optimizing means; and inventory sufficiency determining means for determining whether the second constraint is met, on the basis of the work-in-process inventory for the item-based solution found by the optimizing means, and wherein if the machine interference determining means determines that the first constraint is not met, then the machine interference control means updates the first penalty cost so as to reduce the level of the machine interference, and if the inventory sufficiency determining means determines that the second constraint is not met, then the inventory control means updates the second penalty cost so as to make the work-in-process inventory sufficient.

15. The multi-item multi-process lot size scheduling apparatus according to claim 12, wherein, for the item-based one-dimensional sub-optimization problem, the first constraint is relaxed by weighting with a first Lagrange multiplier, and the second constraint is relaxed by weighting with a second Lagrange multiplier.

16. The multi-item multi-process lot size scheduling apparatus according to claim 15, further comprising:

machine interference determining means for determining whether the first constraint is met, on the basis of the level of the machine interference in the same machine between the items for the item-based solution found by the optimizing means; and inventory sufficiency determining means for determining whether the second constraint is met, on the basis of the work-in-process inventory for the item-based solution found by the optimizing means, and wherein if the machine interference determining means determines that the first constraint is not met, then the machine interference control means updates the first Lagrange multiplier so as to reduce the level of the machine interference, and if the inventory sufficiency determining means determines that the first constraint is not met, then the inventory control means updates the second Lagrange multiplier so as to make the work-in-process inventory sufficient.

* * * * *